(12) United States Patent
Cowling

(10) Patent No.: US 9,547,706 B2
(45) Date of Patent: Jan. 17, 2017

(54) USING COLOCATION HINTS TO FACILITATE ACCESSING A DISTRIBUTED DATA STORAGE SYSTEM

(71) Applicant: Dropbox, Inc., San Francisco, CA (US)

(72) Inventor: James Cowling, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 317 days.

(21) Appl. No.: 14/224,786

(22) Filed: Mar. 25, 2014

(65) Prior Publication Data

US 2015/0254320 A1 Sep. 10, 2015

Related U.S. Application Data

(60) Provisional application No. 61/950,683, filed on Mar. 10, 2014.

(51) Int. Cl.
*G06F 17/30* (2006.01)
*G06F 3/06* (2006.01)

(52) U.S. Cl.
CPC ... *G06F 17/30581* (2013.01); *G06F 17/30194* (2013.01); *G06F 3/067* (2013.01)

(58) Field of Classification Search
CPC ......... G06F 17/30194–17/30215; G06F 3/067; H04L 67/1097
See application file for complete search history.

(56) References Cited

U.S. PATENT DOCUMENTS

| | | | | |
|---|---|---|---|---|
| 6,374,262 B1* | 4/2002 | Kodama | ............ | G06F 17/30575 707/623 |
| 7,788,224 B2* | 8/2010 | Fleck | ................. | G06F 17/30581 707/610 |
| 8,392,482 B1* | 3/2013 | McAlister | ......... | G06F 17/30584 707/771 |
| 8,959,067 B1* | 2/2015 | Patiejunas | ......... | G06F 17/30377 707/696 |
| 2003/0115433 A1* | 6/2003 | Kodama | ............. | G06F 11/2069 711/162 |
| 2005/0125625 A1* | 6/2005 | Kilian | .................... | G06F 3/0611 711/202 |
| 2005/0125627 A1* | 6/2005 | Kilian | ................. | H04L 45/7453 711/202 |
| 2005/0144172 A1* | 6/2005 | Kilian | ................ | G06F 17/30949 |
| 2007/0282915 A1* | 12/2007 | Vosshall | ............ | G06F 17/30575 |

(Continued)

*Primary Examiner* — Robert Beausoliel, Jr.
*Assistant Examiner* — Nirav K Khakhar
(74) *Attorney, Agent, or Firm* — Hickman Palermo Becker Bingham LLP

(57) ABSTRACT

The disclosed embodiments relate to a system that uses colocation hints to facilitate storing data blocks in a distributed data storage system, which includes a plurality of data centers. During operation, the system receives a write request from a client to write a data block to the distributed data storage system, wherein the write request includes a colocation hint that identifies a colocation group associated with the data block. In response to the write request, the system uses the colocation hint to identify one or more data centers associated with the colocation group. Next, the system writes copies of the data block to the one or more identified data centers. In this way, the system situates copies of data blocks associated with the colocation group in the same data centers when possible.

22 Claims, 11 Drawing Sheets

(56) References Cited

U.S. PATENT DOCUMENTS

| | | | | |
|---|---|---|---|---|
| 2008/0059749 A1* | 3/2008 | Kathuria | ............ | G06F 17/30339 |
| | | | | 711/170 |
| 2013/0254240 A1* | 9/2013 | Kurita | ............... | G06F 17/30289 |
| | | | | 707/802 |
| 2014/0195745 A1* | 7/2014 | Shiratori | ................. | G06F 12/00 |
| | | | | 711/154 |

* cited by examiner

USING COLOCATION HINTS TO FACILITATE ACCESSING A DISTRIBUTED DATA STORAGE SYSTEM

RELATED APPLICATIONS

This application claims priority under 35 U.S.C. §119 to U.S. Provisional Patent Application No. 61/950,683, filed on 10 Mar. 2014, entitled "Using Colocation Hints to Facilitate Accessing a Distributed Storage System" by inventor James Cowling. This application is also related to U.S. Non-Provisional application Ser. No. 14/091,119, entitled "Multi-Level Lookup Architecture to Facilitate Failure Recovery," by inventors James Cowling and Kevin P. Modzelewski, filed on 26 Nov. 2013.

BACKGROUND

Field

The disclosed embodiments generally relate to data storage systems. More specifically, the disclosed embodiments relate to the design of a data storage system that uses colocation hints provided by a client application to facilitate accessing data blocks in a distributed data storage system.

Related Art

Organizations are beginning to use cloud-based storage systems to store large volumes of data. These cloud-based storage systems are typically operated by hosting companies that maintain a sizable storage infrastructure, often comprising thousands of servers that that are sited in geographically distributed data centers. Customers typically buy or lease storage capacity from these hosting companies. In turn, the hosting companies provision storage resources according to the customer's requirements and enable the customers to access these storage resources.

To provide fault tolerance, data items are often replicated across different storage devices. In this way, if a specific storage device fails, the data items on the failed storage device can be accessed from other storage devices. To provide an even higher level of fault tolerance, data items can be replicated across geographically distributed data centers. In this way, if a data center fails (or becomes inaccessible), copies of the data items on the data center can be accessed from another data center.

For efficiency reasons, it is desirable to "colocate" copies of a related set of data items at the same data center. In this way, an application can access the set of related data items from a single data center, without having to perform a large number of slow accesses to remote data centers. For example, colocating a set of associated files at the same data center enables a client application to efficiently perform a keyword search through the set of files. In contrast, if the set of files needs to be accessed from multiple data centers, the same keyword search would be extremely time consuming.

Also, if a set of data items is replicated across multiple data centers, it is desirable for each data center holding such data items to have a complete copy of the set of data items. In this way, if a data center containing the set of data items fails, the set of data items can be accessed from another data center that contains a complete copy of the set of data items. This is more efficient than accessing the set of data items from multiple data centers.

Hence, what is needed is a system that facilitates colocating related data items within a distributed data storage system.

SUMMARY

The disclosed embodiments relate to a system that uses colocation hints to facilitate storing data blocks in a distributed data storage system that includes a plurality of data centers. During operation, the system receives a write request from a client to write a data block to the distributed data storage system, wherein the write request includes a colocation hint that identifies a colocation group associated with the data block. In response to the write request, the system uses the colocation hint to identify one or more data centers associated with the colocation group. Next, the system writes copies of the data block to the identified data centers. In this way, the system situates copies of data blocks associated with the colocation group in the same data centers when possible. (Note that these colocation hints are merely "hints" and are not mandatory. The system is at liberty to deviate from these colocation hints if it is expedient to do so.)

In some embodiments, while using the colocation hint to identify the one or more data centers, the system performs the following operations. First, the system performs a lookup using the colocation hint in a location map that associates colocation groups with associated data centers. If the lookup successfully returns an entry, the system uses data centers listed in the entry as the one or more identified data centers. On the other hand, if the lookup fails to return an entry, which indicates that the corresponding colocation group is not associated with any data centers, the system associates the colocation group with one or more data centers, and updates the location map accordingly.

In some embodiments, the system processes a read request as follows. At the start of the process, the system receives a read request from a client to read a data block from the distributed data storage system, wherein the read request includes a global identifier for the data block. In response to the read request, the system uses the global identifier to look up one or more data centers associated with the data block. Next, the system reads a copy of the data block from one of the identified data centers, and returns the copy of the data block to the client.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Before describing the details of the data storage system, we first describe the structure of an exemplary online content-management system 120, that includes such a data storage system and that operates within such a content-management environment 105.

Content-Management Environment

Figure 1:
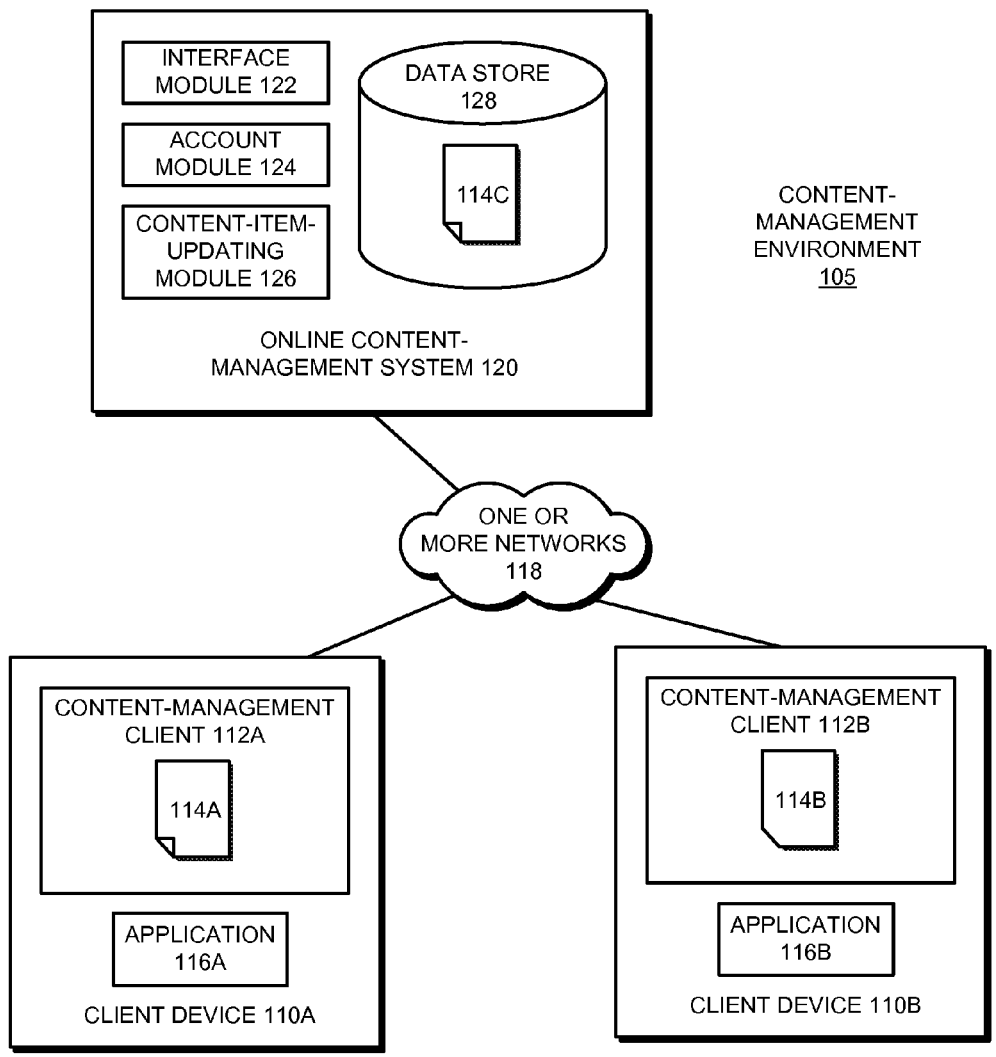
FIG. 1 illustrates a content-management environment in accordance with the disclosed embodiments.

FIG. 1 illustrates content-management environment 105 according to various embodiments. As may be understood from this figure, content-management environment 105 includes a plurality of client devices 110A and 110B (collectively 110) and an online content-management system 120 that are interconnected by one or more networks 118. Various aspects of the client devices 110 and online content-management system 120 are discussed below.

Client Devices

In various embodiments, each client device 110 may selectively execute a content-management client application 112A and 112B (collectively 112) (also referred to as a "content-management client") that may be used to access content items stored within online content-management system 120. In some embodiments, synchronized copies of a content item 114A, 114B and 114C are maintained on client devices 110A and 110B and within online content-management system 120, respectively. (Note that a "content item" can include a file, a folder, a set of folders, or any other type of data object.) In some embodiments, client devices 110 may provide a file-browser type interface (not shown) for directly manipulating the content items stored on online content-management system 120 without maintaining a local copy. Client devices 110 may also include applications 116A and 116B (collectively 116) that manipulate copies of content items 114A and 114B.

While only two client devices 110A and 110B are shown in FIG. 1 for purposes of clarity, it should be understood by those skilled in the art that many client devices 110 may simultaneously connect through network(s) 118 to online content-management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synched copy of one or more content items from within online content-management system 120, and the content items may be stored in any suitable format. When content-management client 112 presents content items that are stored within the online content-management system 120 to a user, the content items may be arranged in folders and the folders themselves may be arranged in other folders, or in any other arbitrary arrangement supported by online content-management system 120, as determined by the user. However, one of skill in the art should understand in light of this disclosure that each user's content item storage architecture may be considerably different from the next, and in some instances, the content item storage architecture may be implemented to maximize storage and content item retrieval efficiency.

Content-Management System

Online content-management system 120 stores content items and manages access to those content items via client devices 110. Online content-management system 120 and its components may be implemented using any appropriate hardware and software that supports file serving, storage, and retrieval functions. For example, online content-management system 120 may be implemented in a single server or multiple servers.

In various embodiments, online content-management system 120 includes interface module 122, account module 124, content-item-updating module 126, and data store 128. Some of the elements of online content-management system 120 are discussed below.

Content-Management System—Interface Module

In particular embodiments, interface module 122 may facilitate content item access and content item storage operations among online content-management system 120 and client devices 110. Interface module 122 may receive content items from and send content items to client devices 110 consistent with the user's preferences for sharing content items. Interface module 122 may also act as the counterpart to a client-side file-explorer style user interface that allows a user to manipulate content items directly stored on online content-management system 120. In some embodiments, software on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via an application 116) and allow a user to manipulate content items stored within online content-management system 120. In this way, the user can directly manipulate content items stored within online content-management system 120.

Content-Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114C is maintained in data store 128 of online content-management system 120. In the embodiment illustrated in FIG. 1, content items 114A, 114B and 114C are local versions of the same shared document that reside on client devices 110A, 110B and online content-management system 120, respectively. Note that client devices 110A and 110B may also store other content items that are replicated on online content-management system 120, but are not shared with other client devices.

In various embodiments, data store 128 may maintain information identifying the user, information describing the user's file directory, and other information in a file journal that is maintained for each user. In some embodiments, the file journal may be maintained on online content-management system 120, and in other embodiments, a file journal (e.g., a "server-side file journal") may be maintained on both online content-management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within online content-management system 120 and the copy of the content item 114B on client device 110B. Similarly, any changes that are made to content item 114C on online content-management system 120 may also be automatically reflected in the copy of content item 114A stored on client device 110A, and the copy of content item 114B stored on client device 110B.

Also, content items 114A and 114B may be stored in local caches within content-management clients 112A and 112B, respectively. Alternatively, content items 114A and 114B may be stored in local file systems within content-management clients 112A and 112B. In some situations, content items 114A and 114B are stored in file system space that is reserved for content-management clients 112A and 112B. In other situations, content items 114A and 114B are stored in normal file system space that is not reserved for content-management clients 112A and 112B.

Content-Management System—Account Module

In particular embodiments, account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on online content-management system 120 may be associated with each of the user's respective client devices. In some embodiments, an application running on each respective client device 110 may help to coordinate synchronization of content items on the client device with corresponding versions of the content items within the user's account in online content-management system 120, and also with corresponding versions of the content items stored on the user's various other client devices.

Content-Management System—Content-Item-Updating Module

In particular embodiments, content-item-updating module 126 is configured to maintain consistency among different copies (versions) of a content item 114A, 114B and 114C that are located in client device 110A, client device 110B and online content-management system 120, respectively. This can be complicated, because the different versions 114A, 114B and 114C of the same shared content items may be simultaneously changed at client devices 110A-B and online content-management system 120. Hence, online content-management system 120 needs to enforce an updating policy to resolve conflicting updates to different versions of the same content item. For example, the copy of the content item 114C on online content-management system 120 can be the master copy of the content item, and updates to the various copies 114A and 114B of the content item can be serialized and applied one-at-a-time to the master copy 114C before being propagated back to the copies 114A and 114B located on client devices 110A and 110B.

Data Centers

Figure 2:
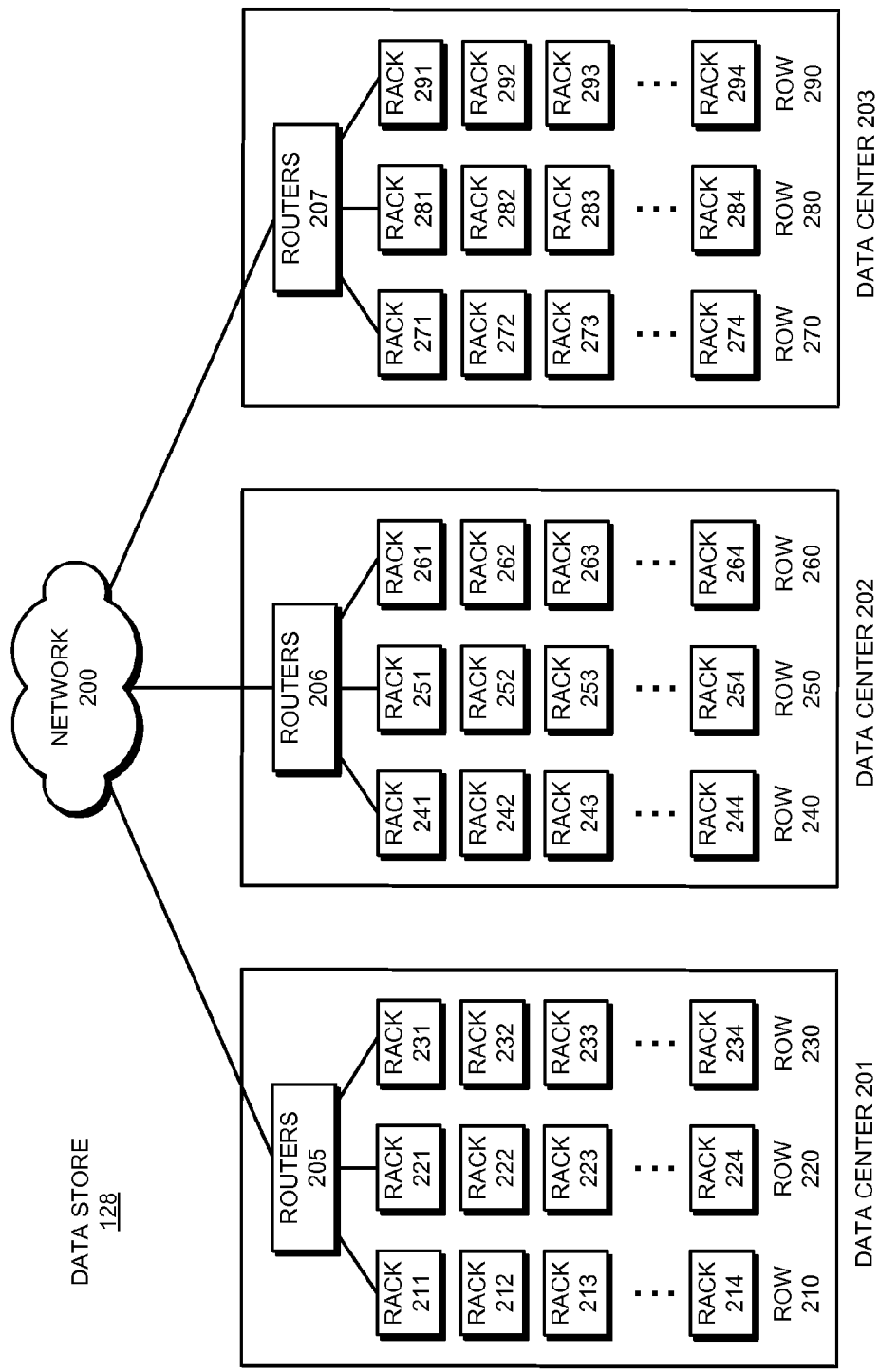
FIG. 2 illustrates a set of data centers in accordance with the disclosed embodiments.

We next describe the data centers that provide the infrastructure for the data storage system. FIG. 2 illustrates an exemplary data store 128 (from FIG. 1) that comprises a set of data centers 201-203 in accordance with the disclosed embodiments. Note that data store 128 can be smaller than the system illustrated in FIG. 2. (For example, data store 128 can comprise a single server that is connected to a number of disk drives, a single rack that houses a number of servers, a row of racks, or a single data center with multiple rows of racks.) As illustrated in FIG. 2, data store 128 can include a set of geographically distributed data centers 201-203 that may be located in different states, different countries or even on different continents.

Data centers 201-203 are coupled together through a network 200, wherein network 200 can be a private network with dedicated communication links, or a public network, such as the Internet, or a virtual-private network (VPN) that operates over a public network.

Communications to each data center pass through a set of routers that route the communications to specific storage nodes within each data center. More specifically, communications with data center 201 pass through routers 205, communications with data center 202 pass through routers 206, and communications with data center 203 pass through routers 207.

As illustrated in FIG. 2, routers 205-207 channel communications to storage devices within the data centers, wherein the storage devices are incorporated into servers that are housed in racks, wherein the racks are organized into rows within each data center. For example, the racks within data center 201 are organized into rows 210, 220 and 230, wherein row 210 includes racks 211-214, row 220 includes racks 221-224 and row 230 includes racks 231-234. The racks within data center 202 are organized into rows 240, 250 and 260, wherein row 240 includes racks 241-244, row 250 includes racks 251-254 and row 260 includes racks 261-264. Finally, the racks within data center 203 are organized into rows 270, 280 and 290, wherein row 270 includes racks 271-274, row 280 includes racks 281-284 and row 290 includes racks 291-294.

As illustrated in FIG. 2, data store 128 is organized hierarchically, comprising multiple data centers, wherein machines within each data center are organized into rows, wherein each row includes one or more racks, wherein each rack includes one or more servers, and wherein each server (also referred to as an "object storage device" (OSD)) includes one or more storage devices (e.g., disk drives).

Data Storage System

Figure 3:
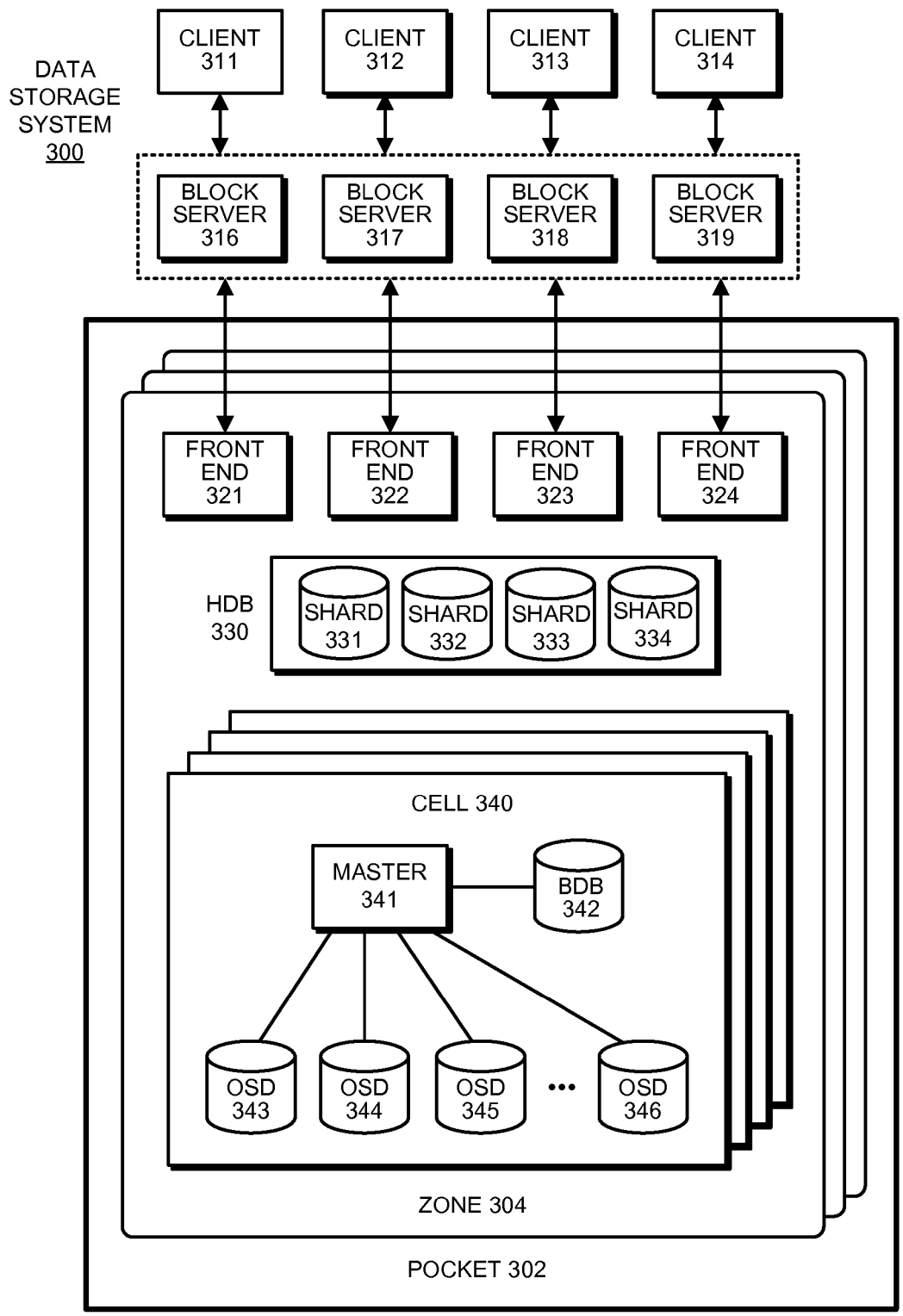
FIG. 3 illustrates the logical structure of the data storage system in accordance with the disclosed embodiments.

FIG. 3 illustrates the logical structure of the data storage system 300 in accordance with the disclosed embodiments. As illustrated in FIG. 3, data storage system 300 includes a logical entity called a "pocket" 302 that in some embodiments is equivalent to an Amazon S3™ bucket. Each pocket is completely distinct; nothing is shared between pockets. For example, in an exemplary implementation, the system provides a "block storage pocket" to store data files, and a "thumbnail pocket" to store thumbnail images for data objects. Note that the applications specify which pockets are to be accessed.

Within a pocket one or more "zones" exist that are associated with physical data centers, and these physical data centers can reside at different geographic locations. For example, one data center might be located in California, another data center might be located in Virginia, and another data center might be located in Europe. For fault-tolerance purposes, data can be stored redundantly by maintaining multiple copies of the data on different servers within a single data center and also across multiple data centers.

For example, when a data item first enters a data center, it can be initially replicated to improve availability and provide fault tolerance. It can then be asynchronously propagated to other data centers.

Note that storing the data redundantly can simply involve making copies of data items, or alternatively using a more space-efficient encoding scheme, such as erasure codes (e.g., Reed-Solomon codes) or Hamming codes to provide fault tolerance.

Within each zone (such as zone 304 in FIG. 3), there exist a set of front ends 321-324, a hash database (HDB) 330 and a set of "cells," such as cell 340 illustrated in FIG. 3. A typical cell 340 includes a number of object storage devices (OSDs) 343-346, wherein the individual OSDs 343-346 include storage devices that actually store data blocks. Cell 340 also includes a "master" 341, which is in charge of managing OSDs 343-346 and a bucket database (BDB) 342 described in more detail below. (Note that HDB 330 and BDB 342 are logical databases which can be stored redundantly in multiple physical databases to provide fault tolerance.)

Master 341 performs a number of actions. For example, master 341 can determine how many writeable buckets the system has at any point in time. If the system runs out of buckets, master 341 can create new buckets and allocate them to the storage devices. Master 341 can also monitor OSDs and associated storage devices, and if any OSD or storage device fails, master 341 can migrate the associated buckets to other OSDs.

As illustrated in FIG. 3, a number of block servers 316-319, which are typically located in a data center associated with a zone, can service requests from a number of clients 311-314. For example, clients 311-314 can comprise applications running on client machines and/or devices that access data items in data storage system 300. Block servers 316-319 in turn forward the requests to front ends 321-324 that are located within specific zones, such as zone 304 illustrated in FIG. 3. Note that clients 311-314 communicate with front ends 321-324 through block servers 316-319, and the front ends 321-324 are the only machines within the zones that have public IP addresses.

Files to be stored in data storage system 300 comprise one or more data blocks that are individually stored in data storage system 300. For example, a large file can be associated with multiple data blocks, wherein each data block is 1 MB to 4 MBs in size.

Moreover, each data block is associated with a "hash" that serves as a global identifier for the data block. The hash can be computed from the data block by running the data block through a hash function, such as a SHA-256 hash function. (The SHA-256 hash function is defined as a Federal Information Processing Standard (FIPS) by the U.S. National Institute of Standards and Technology (NIST).) The hash is used by data storage system 300 to determine where the associated data block is stored.

Get( ) Operation

The system performs a number of operations while processing data accesses on behalf of clients 311-314. For example, when a get( ) operation is received along with an associated hash, the hash is used to perform a lookup in HDB 330. This lookup returns an identifier for a "bucket" and associated cell where the data block is stored.

To streamline failure-recovery operations, a large number of data blocks can be aggregated into larger buckets. For example, a number of 1-4 MB data blocks can be aggregated into a single 1 GB bucket, wherein each bucket is stored in a specific cell. This enables the system to manipulate a small number of buckets during a failure-recovery operation instead of manipulating a large number of individual data blocks. Aggregating data blocks into buckets also greatly decreases the amount of metadata the system has to maintain and manipulate; this is advantageous because metadata is computationally expensive to maintain and manipulate.

Because a large number of data blocks can exist in data storage system 300, HDB 330 can potentially be very large. If HDB 330 is very large, it is advantageous to structure HDB 330 as a "sharded" database. For example, when performing a lookup based on a hash in HDB 330, the first 8 bits of the hash can be used to associate the hash with one of 256 possible shards, and this shard can be used to direct the lookup to an associated instance of HDB 330. For example, as illustrated in FIG. 3, HDB 330 can comprise 4 instances 331-334, wherein instance 331 is associated with shards 1-64, instance 332 is associated with shards 65-128, instance 333 is associated with shards 129-192 and instance 334 is associated with shards 193-256. In other embodiments, HDB 330 can be divided into more or fewer instances. (Note that a zone can include a "ZooKeeper™ cluster" that is responsible for mapping shards to specific target cells and also mapping shards to physical HDB machines.)

HDB instances 331-334 are logical databases that are mapped to physical databases, and to provide fault tolerance, each logical database can be redundantly stored in multiple physical databases. For example, in one embodiment, each HDB instance maps to three physical databases. If data storage system 300 is very large (for example containing trillions of data blocks), HDB 330 will be too large to fit in random-access memory. In this case HDB 330 will mainly be stored in non-volatile storage, which for example, can comprise flash drives or disk drives.

After the bucket and associated cell are identified for the get( ) operation, the system performs a lookup in a bucket database (BDB) 342 in the associated cell 340. This lookup returns an identifier for an object storage device (OSD) 343 where the bucket is located. Note that because each bucket is fairly large (e.g., 1 GB) and contains a large number of data blocks, BDB 342 is relatively small and can typically be stored in random-access memory, which greatly speeds up the lookup process.

Finally, within the OSD, the system performs a lookup based on the bucket and the hash to determine an offset and a length for the data block in a write-ahead log that stores data blocks for the bucket. The system then returns the data block from the determined offset in the write-ahead log. Note that because data storage system 300 is designed to store "immutable data" that does not change after it is written, it is efficient to store the immutable data in a write-ahead log, as opposed to a random-access structure. Because the data is never overwritten, writes do not require more-complex and time-consuming random-access lookup mechanisms.

Put( ) Operation

During a put( ) operation, the system receives a data block to be written from a client. To process the put( ) operation, the system first computes a hash from the data block, for example using the SHA-256 technique described above. Next, the system selects a writeable bucket and an associated cell for the data block. Note that front ends 321-324 periodically poll all the BDBs to identify and then cache writeable buckets. This enables front ends 321-324 to keep track of a number of buckets (e.g., 10 to 100 buckets) that they know are writeable at any given time. Then, when a put( ) operation is subsequently received, a front end simply selects a cached bucket that it knows is writable.

Within the associated cell, the system uses an identifier for the selected bucket to perform a lookup in the BDB. This lookup returns one or more OSDs for the bucket. (Note that the bucket may be replicated across multiple OSDs to provide fault tolerance.) Within the OSDs, the system appends the data block to a write-ahead log that stores data blocks for the bucket. After the data is stably written to the OSDs, the system writes the hash-to-bucket mapping to the HDB 330.

Note that the master 341 modifies the BDB 342 and the front end 321 modifies the HDB 330. In general, master 341 is concerned with reliability of storage, and hence performs operations to facilitate redundancy and rebalancing, while the front end 321 is generally concerned with finding information and simply maps hashes to logical constructs, such as buckets.

Master 341 performs various operations to detect and handle failures. More specifically, master 341 periodically performs health checks on OSDs. If master 341 detects a failure in an OSD, the associated buckets are degraded and the master sets the buckets to be non-writable. Note that get( ) operations have to access the buckets where the blocks are stored, but put( ) operations can be directed to any bucket that is currently writeable, so when a problem happens with a bucket, the system simply marks the bucket as non-writeable. The system can continue performing get( ) operations on the degraded bucket, because there exist multiple copies of the degraded bucket.

To handle a failure associated with a bucket, master 341 tells the associated OSDs to freeze the bucket. Master 341 then tells the OSDs to replicate the bucket to a new OSD. The system then adds the new OSD to the cluster, increments the generation number for the OSD, and marks the bucket as writeable. (Note that when a degraded OSD is restarted after a failure, it will not accept any reads because its generation number is old.) The system guarantees that every OSD in the current generation has valid data.

The system also includes mechanisms to perform compaction operations. Although the data stored in data storage system 300 is immutable, the system often needs to delete data items when users remove them from the system. In some embodiments, the system tracks deleted data items in a log, and when the usable storage in a given bucket falls below a threshold, the system compacts the bucket.

Object Storage Device

Figure 4A:
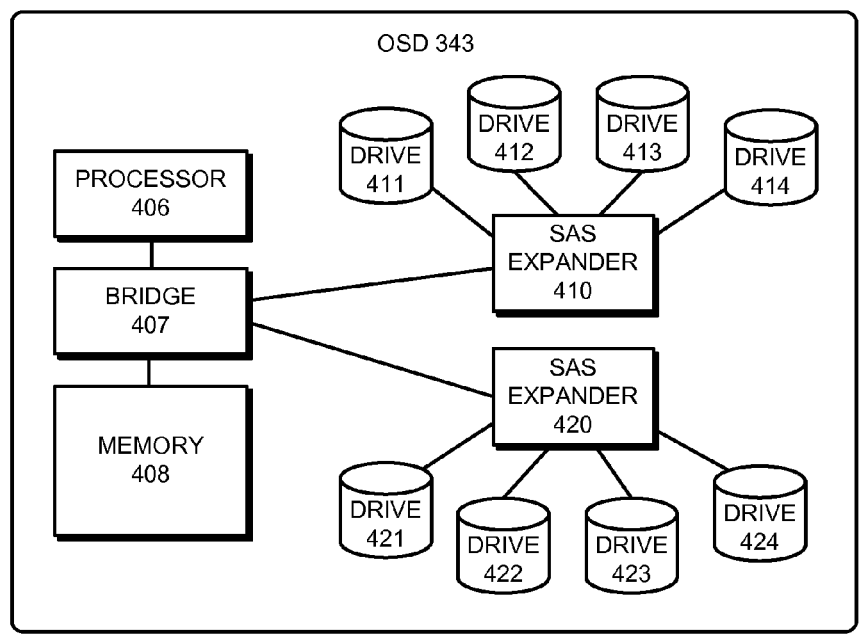
FIG. 4A illustrates the structure of an object storage device (OSD) in accordance with the disclosed embodiments.

FIG. 4A illustrates the structure of an exemplary object storage device (OSD) 343 in accordance with the disclosed embodiments. As illustrated in FIG. 4, OSD 343 includes a processor 406 that is connected to a memory 408 through a bridge 407. Processor 406 is also coupled to Serial Attached SCSI (SAS) expanders 410 and 420, where SAS expander 410 is coupled to disk drives 411-414 and SAS expander 420 is coupled to disk drives 421-424. (Note that SAS expanders 410 and 420 may be coupled to more or fewer disk drives.) Also, note that a failure in OSD 343 can involve a failure of a single one of the disk drives 411-414 or 421-424, or a failure that affects all or most of OSD 343, such as a failure in processor 406, bridge 407, memory 408, SAS expanders 410 and 420 or one of the associated data paths.

Write-Ahead Log

Figure 4B:
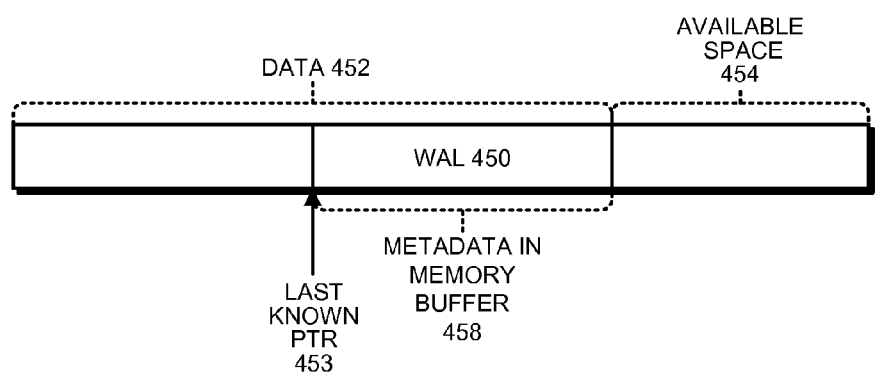
FIG. 4B illustrates the structure of a write-ahead log (WAL) in accordance with the disclosed embodiments.

FIG. 4B illustrates the structure of a write-ahead log (WAL) 450 which is maintained within an OSD (such as OSD 343) in accordance with the disclosed embodiments. WAL 450 provides a log-structured data store which is advantageous for storing immutable data. WAL 450 comprises one or more 1 GB extents which can be associated with the logical buckets described above. As illustrated in FIG. 4B, an extent can include a "data portion" 452 that has already been written to, and an unwritten portion that contains available space 454. The data blocks that are stored within data portion 452 are associated with metadata that, for example, contains hashes and the offsets for the data blocks. To improve performance, metadata associated with recently written data blocks 458 can be stored in a memory buffer. When the system recovers from a failure, all of the metadata can be reconstructed by scanning through WAL 450 starting from a last known pointer 453.

During a put( ) operation, the system synchronously appends the data block and an associated header to the WAL 450, wherein the header includes a number of data items associated with the block, including the hash and the length of the block. At the same time, the system synchronously adds metadata to the memory buffer. When a bucket becomes full, the system seals the bucket, and the bucket never gets modified again.

During a get( ) operation, the system checks the memory buffer to find the offset and length for the data block. The system then uses the offset and length to read the data block from WAL 450.

Get( ) Operation

Figure 5:
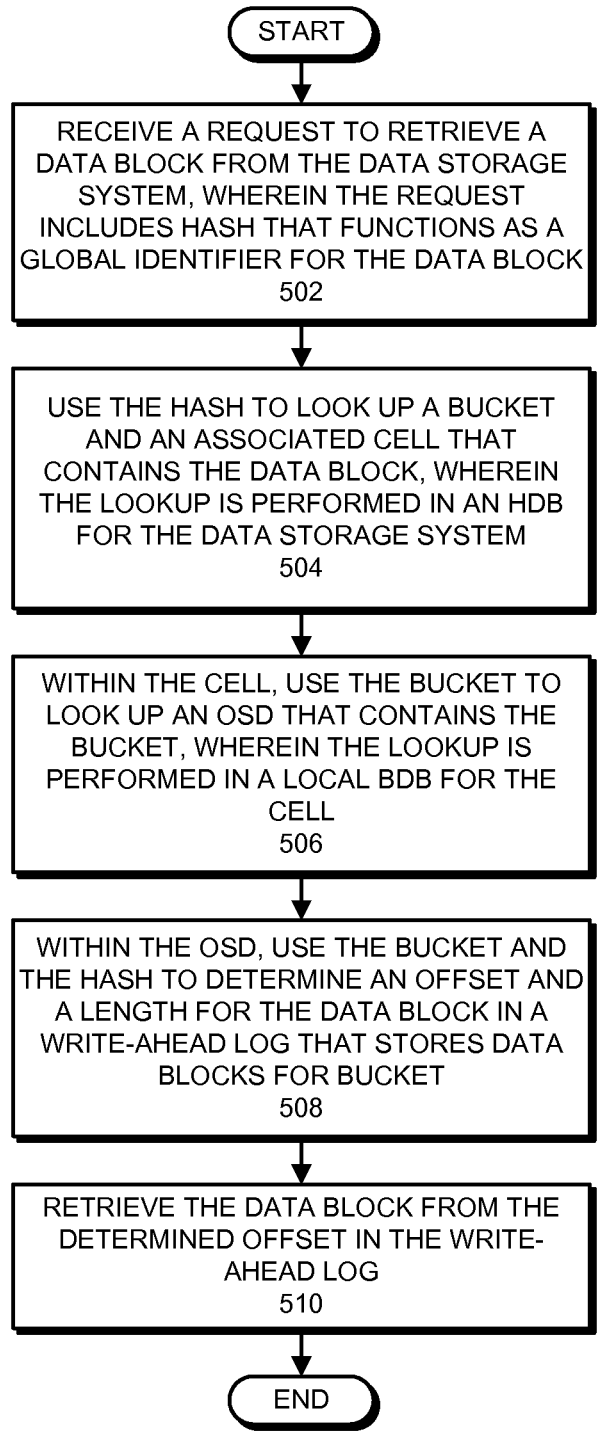
FIG. 5 presents a flow chart illustrating how a get( ) operation is processed in accordance with the disclosed embodiments.

FIG. 5 presents a flow chart illustrating how a "get( )" operation is processed in accordance with the disclosed embodiments. At the start of this process, the system receives a request to retrieve a data block from the data storage system, wherein the request was generated by a client performing a get( ) operation. This request includes a hash parameter that functions as a global identifier for the data block (step 502). Next, the system uses the hash to look up a bucket and an associated cell that contains the data block, wherein the lookup is performed in an HDB for the data storage system (step 504). Recall that the HDB can be a sharded database, and this lookup can involve examining the first byte of the hash to identify a corresponding shard, and then performing the lookup in a specific HDB instance associated with the shard. Also, recall that this lookup is likely to involve a random disk seek.

Within the cell, the system uses the bucket to look up an OSD that contains the bucket, wherein the lookup is performed in a local BDB for the cell (step 506). Recall that because the local BDB can be stored in memory, this lookup can be fast. Then, within the OSD, the system uses the bucket and the hash to determine an offset and a length for the data block in a write-ahead log that stores data blocks for the bucket (step 508). Finally, the system returns the data block from the determined offset in the write-ahead log (step 510).

Put( ) Operation

Figure 6:
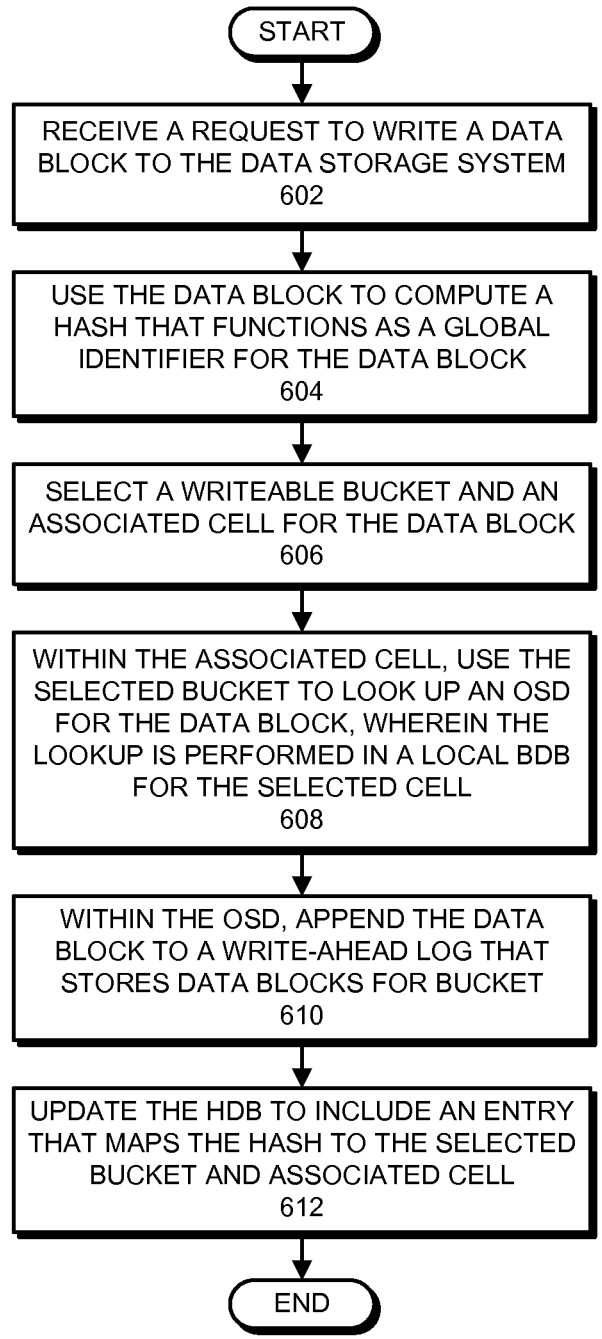
FIG. 6 presents a flow chart illustrating how a put( ) operation is processed in accordance with the disclosed embodiments.

FIG. 6 presents a flow chart illustrating how a "put( )" operation is processed in accordance with the disclosed embodiments. At the start of this process, the system receives a request to write a data block to the data storage system, wherein the request was generated by a client performing a put( ) operation (step 602). Next, the system uses the data block to compute a hash that functions as a global identifier for the data block (step 604). As mentioned above, computing this hash can involve feeding the data block through a SHA-256 hash module. Then, the system selects a writeable bucket and an associated cell for the data block (step 606). Recall that the system maintains a pool of available buckets. Within the associated cell, the system uses the selected bucket to look up an OSD for the data block, wherein the lookup is performed in a local BDB for the selected cell (step 608). Because the BDB is typically located in memory, this lookup can be fast. (Also, note that the bucket can be replicated across a number of cells, in which case the lookup returns multiple OSDs containing copies of the bucket, and the data block is written to each of the multiple OSDs.)

Next, within the OSD, the system appends the data block to a write-ahead log that stores data blocks for the bucket (step 610). Note that committing the write-ahead log to disk typically involves a sequential disk seek. Finally, the system updates the HDB to include an entry that maps the hash to the selected bucket and associated cell (step 612).

Recovering from a Storage Device Failure

Figure 7:
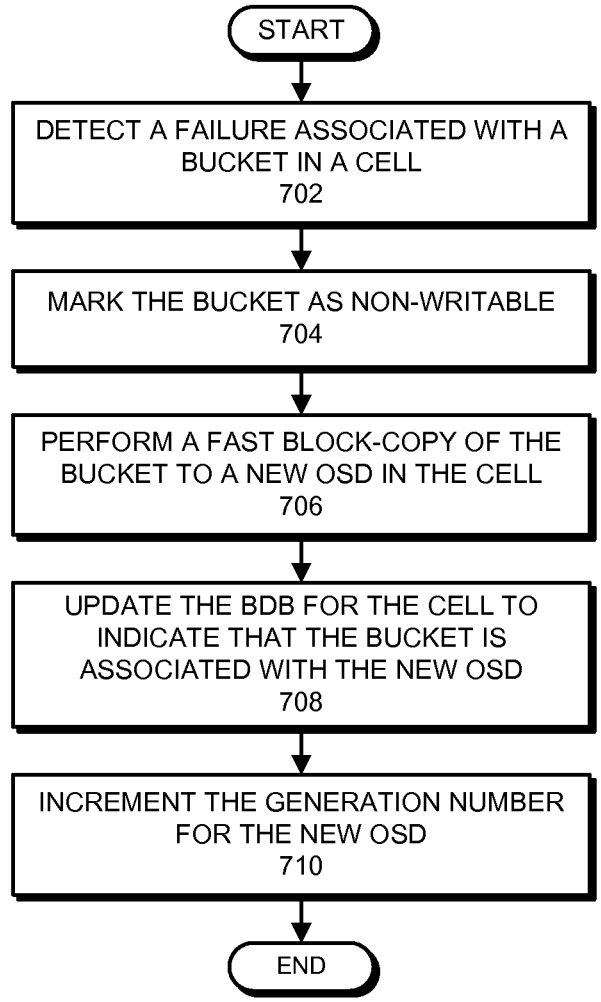
FIG. 7 presents a flow chart illustrating how a failure of a storage device is handled in accordance with the disclosed embodiments.

FIG. 7 presents a flow chart illustrating how a failure of a storage device is handled in accordance with the disclosed embodiments. At the start of this process, the system detects a failure associated with a bucket in a cell (step 702). (For example, the system can detect a failure in an OSD that stores a copy of the bucket.) Next, the system marks the bucket as non-writable (step 704). The system then performs a fast block-copy of the bucket to a new OSD in the cell (step 706). The systems also updates the BDB for the cell to indicate that the bucket is associated with the new OSD (step 708). Finally, the system increments the new generation number for the OSD (step 710). Recall that when a degraded OSD is restarted after a failure, it will not accept any reads or writes because its generation number is old.

Colocation Hints

As mentioned above, it often advantageous to "colocate" a set of related items in the same data center to facilitate various operations, such as searching through the set of data items, or performing a batch job involving the set of data items. This colocation can be facilitated by providing an access mechanism that maps the related set of data blocks to the same data center (location). When a data block is being written to the storage system, the access mechanism determines what data centers to write the block to. Similarly, when a data block is being read for the storage system, the access mechanism determines what data centers the block can be read from. Also, because data items are often replicated across multiple data centers for fault tolerance purposes, the access mechanism additionally handles the mapping of replicated copies of data items to their associated data centers. (Note that some applications may not require any replication, while other applications might require replication across two or more locations.)

It is desirable for the above-described access mechanism to map data blocks to data centers in a manner that supports: (1) colocation of a related set of data items; (2) a decentralized index to facilitate efficient mapping operations at each data center; (3) fault tolerance; (4) replication of data items within a data center; and (5) replication of data items between data centers.

A naïve technique for mapping blocks to data centers is to provide a global index that maps each block identifier (hash) to one or more data centers. However, large storage infrastructures can potentially store hundreds of billions of data blocks, so the resulting index can be extremely large, which makes the index hard to replicate across multiple data centers. (On the other hand, if the index is only stored at a single location, the location can possibly fail and the index can be lost.) Moreover, an index that simply maps block identifiers to locations does not by itself provide a mechanism for associating data blocks with specific colocation groups.

Another possible technique for mapping blocks to locations involves using a namespace-based location mapping technique. In such systems, namespaces are typically associated with users, and every data block belongs to a particular namespace. Moreover, every user has a root namespace, and all files that the user uploads are owned by this root namespace.

A namespace-based mapping technique uses an index that maps namespaces to specific locations (data centers). This technique is advantageous because it requires the system to maintain less state than for a hash-to-location mapping, and also facilitates colocation for data items in the same namespace, which makes it easier to perform searches and batch jobs that typically iterate over a namespace. However, a namespace-based mapping technique has disadvantages: (1) it remains centralized to some extent; (2) it is specific to namespaces, which is not ideal because some applications might want to group related data items in a different manner; (3) it requires the mapping mechanism to know the namespace, which can be a problem because the application needs to somehow communicate the namespace to the system in order to access a data block, and the application may not know the namespace; and (4) it lacks flexibility because a namespace is a relatively static mapping.

Colocation Groups

Instead of using a user-specific namespace to colocate related data items, the disclosed embodiments use an application-managed entity referred to as a "colocation group" to facilitate colocating related data items. An application can manage a colocation group by providing "colocation hints" as parameters in associated data-access commands.

Figure 8A:
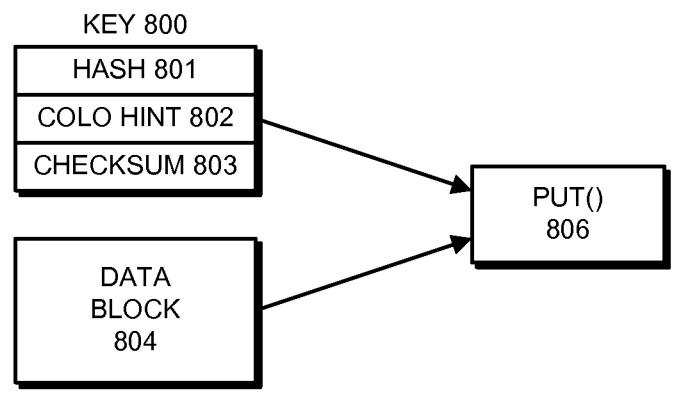
FIG. 8A illustrates the parameters associated with a put( ) operation in accordance with the disclosed embodiments.

For example, FIG. 8A illustrates exemplary inputs to a put( ) (write) operation 806. As illustrated in FIG. 8A, put( ) operation 806 receives a data block 804 to be written and a key structure 800 containing parameters, including: a hash 801 that serves as a global identifier for data block 804; an application-configurable colocation hint (colo hint) 802; and a checksum 803 for the data block. Note that hash 801 is not a required parameter of the put( ) operation, and is typically computed during the put( ) operation 806 by, for example, performing a SHA-256 hash operation on data block 804. Also, note that an application may execute the put( ) operation without supplying a colo hint 802. In this case, the system will perform the put( ) operation, but will not associate the data block with a colocation group. This can lead to inefficiencies if the application wants to access a set of related data items. However, it will not lead to incorrectness.

Figure 8B:
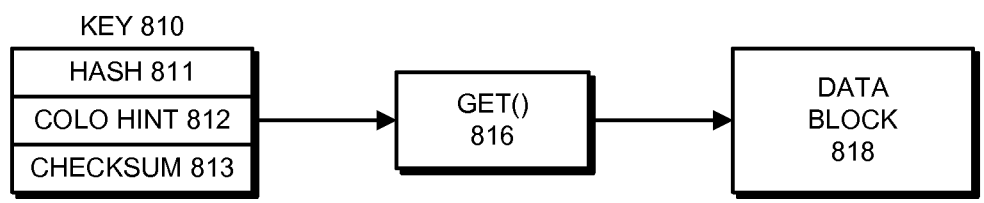
FIG. 8B illustrates the parameters associated with a get( ) operation in accordance with the disclosed embodiments.

FIG. 8B illustrates exemplary inputs and outputs for a get( ) operation 816. As illustrated in FIG. 8B, get( ) operation 816 receives a key structure 810 containing parameters, including a hash 811, a colo hint 812 and a checksum 813. Get( ) operation 816 uses these parameters to retrieve and return a corresponding data block 818. Note that the above-described put( ) operation 806 and get( ) operation 816 enable an application to specify colocation hints, which are used to colocate related data items in the same data center.

Also note that an application can use different types of colocation hints. For example, if an application is accessing a block store, the application can use the namespace identifier as the colocation hint. On the other hand, if the application is accessing a thumbnail store containing thumbnail images associated with other data items, the application can use an application identifier as the colocation hint. Applications can alternatively make use of other identifiers, such as a "user identifier" or a "geographic location identifier," as a colocation hint. Note that allowing the application to specify colocation hints also allows the application to specify what data items are to be stored together at whatever level of granularity that the application requires.

Lookup Structures

Figure 9A:
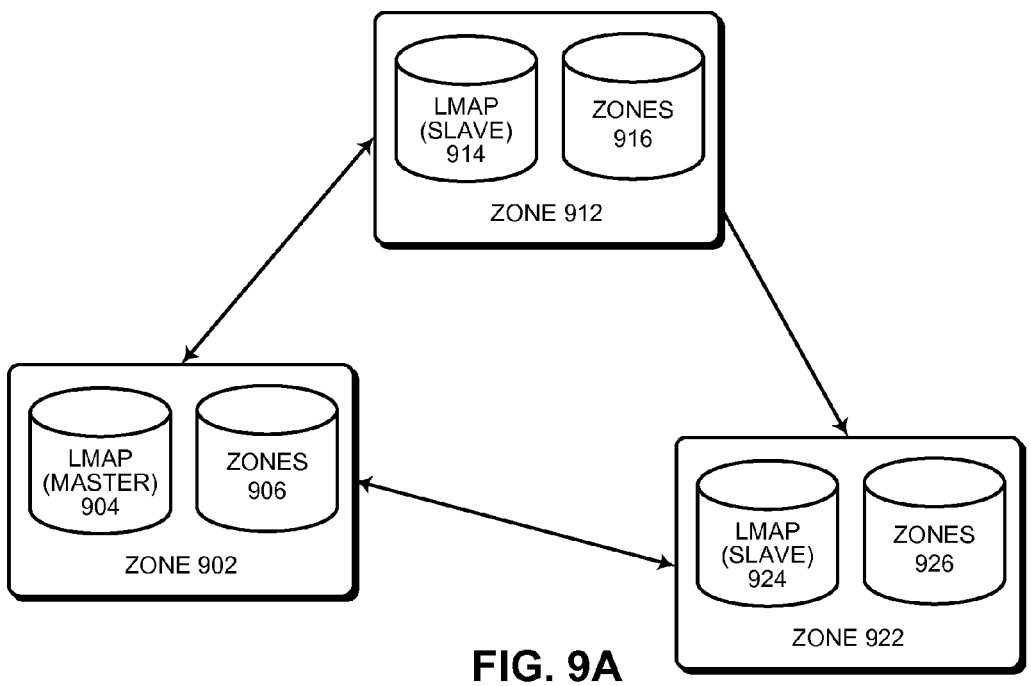
FIG. 9A illustrates lookup structures that facilitate the use of colocation hints in accordance with the disclosed embodiments.

FIG. 9A illustrates exemplary lookup structures that can be used to facilitate using colocation hints in accordance with the disclosed embodiments. As illustrated in FIG. 9A, each zone includes a "location map" (LMAP) that maps colocation hints to zones, and a "zones table" that maps a hash for a data block to the zones containing copies of the data block. (Note that an LMAP can be either a "master instance" or a "slave instance" as is described in more detail below.) Referring to FIG. 9A, zone 902 is associated with LMAP 904 and zones table 906. Similarly, zone 912 is associated with LMAP 914 and zones table 916, and zone 922 is associated with LMAP 924 and zones table 926. Note that LMAP 904 and zones table 906 can be separate lookup structures within zone 902, or they can be integrated into other lookup structures. (For example, zones table 906 can possibly be integrated into HDB 330 in FIG. 3.)

Location Map

Figure 9B:
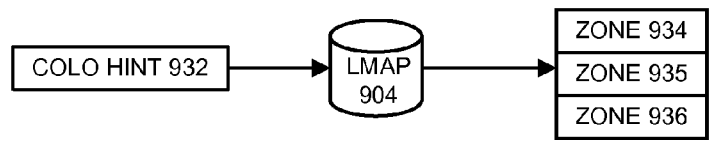
FIG. 9B illustrates the structure of a location map in accordance with the disclosed embodiments.

Referring to FIG. 9B, location map 904 can be used to map a colo hint 932, which identifies a colocation group, to a set of one or more zones 934-936, which store copies of data blocks for the colocation group. For example, if data blocks for a particular colocation group are replicated across three zones, then the corresponding location map entry identifies the three zones 934-936. Note that the number of colocation groups is much smaller than the total number of data blocks in the system. Consequently, location map 904 is relatively small and can be accessed from memory instead of having to access a storage device.

Also, LMAP 904 can be replicated across the different zones to allow servers within each zone to perform lookups without having to access information from other zones. This can be accomplished by using a master-slave architecture, wherein zone 902 contains a master instance of the LMAP 904, and the other zones 912 and 922 contain slave instances of the LMAP 914 and 924, respectively. When this mapping information is updated, the update is first sent to master LMAP 904, and is then propagated to the corresponding slave LMAPs 914 and 924 located in zones 912 and 922, respectively. Note that there can be some delay in propagating these updates to the slaves. However, this is not a problem because the slaves only provide hints about the whereabouts of the colocation groups. If these hints are incorrect, the system will eventually determine that they are incorrect and take remedial action. Hence, stale data in the slaves does not lead to incorrectness, just inefficiency.

Zones Table

Figure 9C:
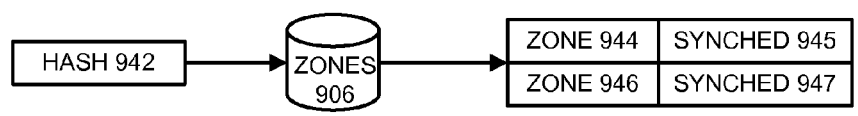
FIG. 9C illustrates the structure of a zones table in accordance with the disclosed embodiments.

Referring to FIG. 9C, zones table 906 can be used to map a hash 942 for a data block to external zones 944 and 946 (which are outside of the local zone 902 containing zones table 906) that contain copies of the data block. Note that the system assumes that a copy of the data block also exists within local zone 902. Hence, zones table 906 can be used to determine which blocks exist in the zone and where else they reside. This is useful because if a disk fails the system needs to know where to retrieve backup copies of the data blocks.

Zones table 906 also contains "synched" flags 945 and 947 for associated zones 944 and 946, respectively, where each synched flag indicates whether the associated data block is known to be stably committed to non-volatile storage within the associated zones 944 and 946. When the system writes to a data block, the corresponding synched flag for the data block is initially set to "false," and is not set to "true" until the system receives an acknowledgment that the block has been stably written to the zones. Note that if a write is directed to another data center and the write fails, the system may have to resend the data block for the write to the other data center to ensure that the data block is stably stored at the other data center.

When a slave receives a colo hint during a put( ) operation, the slave is likely to already have a mapping that says that the colocation group associated with the colo hint is located at specific data centers. Hence, the slave can perform the put( ) operation without having to first go to the master to obtain the mapping information. This reduces the load on the master and also lowers latency. When a slave receives a colo hint during a get( ) operation, the system looks into its local zones table to determine where the block can be retrieved.

In some cases, during a put( ) operation the slave may not have mapping information for the colo hint because this is the first block written to the associated colocation group. In this case, after the slave completes the put( ) operation at its local data center, the slave attempts to update the mapping information at the master. If this mapping information is successfully updated at the master, it will eventually be propagated to the other slaves. In other cases, the slave does not have mapping information for the colo hint because of a delay in propagating the mapping information from the master to the slave. In these cases, after the slave completes the put( ) operation at its local data center, the slave will similarly attempt to update the mapping information at the master. However, the master will determine that it already has mapping information for the colo hint, and will take action to ensure that the data block is properly written to the data centers associated with the colo hint.

If the master is down during a put( ) operation for a new colocation group, the slave can write the data wherever it wants to, and can update the mapping table at a later time. Note that if the master goes down, the mapping information that was contained in the master can be obtained by polling data from associated zones tables.

Interactions Between Block Store Layer and Front Ends

Referring to FIG. 1, during a put( ) operation or a get( ) operation, a number of interactions take place between the block servers 316-319 that the application code communicates with, and the front ends 321-324 that the block servers communicate with. Note that the block servers 316-319 implement a "block store layer" that maps colo hints to zones.

Referring to FIG. 8A, when a put( ) operation is received from an application, it includes the following items: (1) a hash (key) 801, (2) a colo hint 802, (3) a checksum 803, and (4) the data block 804. Next, the block store layer accesses a block store selector to map the hash to associated zones. Then, the block store layer forwards the put( ) operation to the front ends 321-324. In doing so, the block store layer includes the following items: (1) the hash, (2) the block, (3) the zones for the put, and (4) the zone status (known synched information stored as a dictionary). For example, an exemplary put( ) operation which is sent to a first front end can look like the following:
[hash, block, [SJD, ASH], {empty dictionary}],
where SJD and ASH are different data centers. Assuming that the first front end is located at SJD, the first front end can start writing the block to a storage device in SJD, and can also forward the put( ) operation to another front end located in ASH. This forwarded put( ) operation can look like the following:
[hash, block, [ASH], {SJD: false}].
The forwarded put( ) operation enables the second front end in ASH to know where the data came from in case of failure. Note that the synched status for SJD is initially set to "false" and can eventually be updated to "true" when an acknowledgment is received that the block is stably stored at SJD.

Similarly, when the block store layer receives a get( ) operation, it executes a "get_zones_from_key( )" function based on the block key (hash) to determine which data centers the block can be retrieved from. Note that this get_zones_from_key( ) function can use the zones table to determine the relevant zones for the block.

When the zone status indicates that a data block is synched at a remote data center, the system knows it is stably stored at the remote data center. This is useful because the system may need to rely on this information, for example, when the system is deleting a local copy of the data block.

The local system also maintains a "persistent message queue" that keeps track of put( ) operations that the local system is authorized to send to another data center. This persistent message queue keeps track of messages that are going to be sent to remote data centers, so that if a local front end that sent the messages crashes, the persistent message queue can be replayed. A process periodically scans the persistent message queue to see if the blocks are known to be synched. If a block is not known to be synched, the process will retry the associated message.

The system does not indicate to the client that a put( ) operation is complete until: (1) the system has written the data block stably to local storage; and (2) commands to send the data block to the remote data centers are logged in the persistent message queue. Note that the persistent message queue eliminates the need for the system to do a huge table scan of the HDB after a failure to determine which data blocks still need to be synched.

Flow Charts

Figure 10:
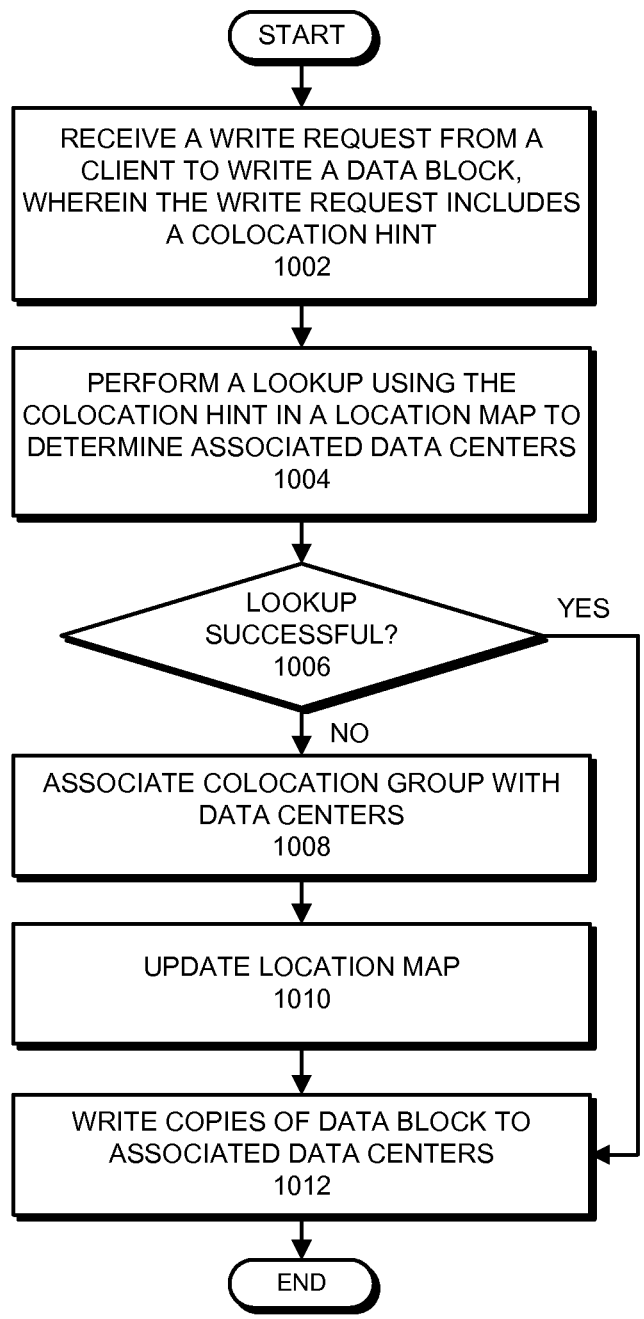
FIG. 10 presents a flow chart illustrating how a put( ) operation associated with a colocation hint is processed in accordance with the disclosed embodiments.

FIG. 10 presents a flow chart illustrating how a write request ("put( ) operation") associated with a colocation hint is processed in accordance with the disclosed embodiments. The system first receives the request from a client to write a data block to the distributed data storage system, wherein the write request includes a colocation hint that identifies a colocation group associated with the data block (step 1002). In response to the write request, the system performs a lookup using the colocation hint in a location map that associates colocation groups with data centers (step 1004). The system then determines whether the lookup was successful (step 1006). If the lookup was successful, the system writes copies of the data block to the one or more associated data centers (step 1012). On the other hand, if the lookup was not successful, which indicates that the corresponding colocation group is not associated with any data centers, the system associates the colocation group with one or more data centers (step 1008), and updates the location map accordingly (step 1010). Next, the system writes copies of the data block to the one or more associated data centers (step 1012).

Figure 11:
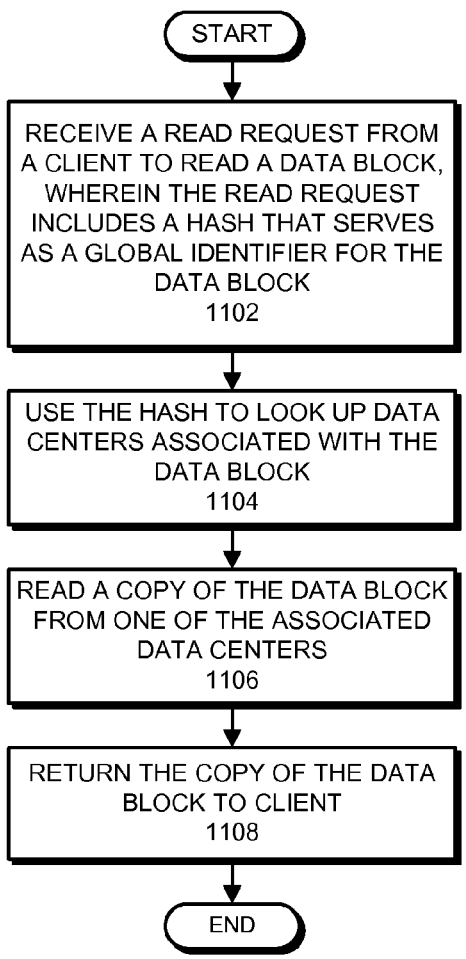
FIG. 11 presents a flow chart illustrating how a get( ) operation associated with a colocation hint is processed in accordance with the disclosed embodiments.

FIG. 11 presents a flow chart illustrating how a read request ("get( ) operation") associated with a colocation hint is processed in accordance with the disclosed embodiments. At the start of the process, the system receives the request from the client to read a data block from the distributed data storage system, wherein the read request includes a hash that serves as a global identifier for the data block (step 1102). In response to the read request, the system uses the hash to look up one or more data centers associated with the data block (step 1104). Next, the system reads a copy of the data block from one of the identified data centers (step 1106), and returns the copy of the data block to the client (step 1108).

Figure 12:
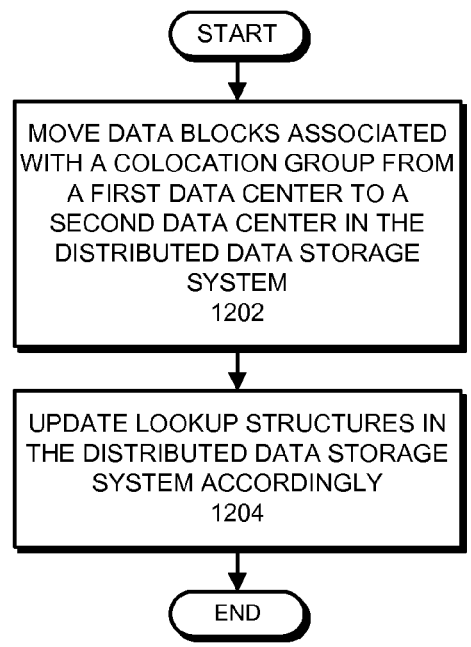
FIG. 12 presents a flow chart illustrating how a colocation group is moved in accordance with the disclosed embodiments.

FIG. 12 presents a flow chart illustrating how a colocation group can be moved between data centers in accordance with the disclosed embodiments. At the start of this process, the system moves data blocks associated with a colocation group from a first data center to a second data center in the distributed data storage system (step 1202). This can happen for a number of reasons. For example, the first data center can become too full, so moving the colocation group to the second data center can free up needed space in the first data center. In another example, the first data center becomes too busy, and moving the colocation group to the second data center reduces the contention involved in accessing the data blocks in the colocation group. After the data blocks are moved, the system updates lookup structures in the distributed data storage system accordingly (step 1204).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A computer-implemented method, comprising:
receiving a write request from a client to write a data block to a distributed data storage system, wherein the write request includes a colocation hint that identifies a colocation group associated with the data block, wherein the distributed data storage system situates copies of data blocks associated with the colocation group in the same data centers when possible; and
in response to the write request,
using the colocation hint to identify one or more data centers associated with the colocation group, and
writing copies of the data block to the one or more identified data centers.

2. The computer-implemented method of claim 1, wherein using the colocation hint to identify the one or more data centers comprises:
performing a lookup using the colocation hint in a location map that associates colocation groups with data centers;
if the lookup successfully returns an entry, using data centers listed in the entry as the one or more identified data centers; and
if the lookup fails to return an entry, which indicates that the corresponding colocation group is not associated with any data centers,
associating the colocation group with one or more data centers, and
updating the location map accordingly.

3. The computer-implemented method of claim 2,
wherein the location map is replicated across all data centers in the distributed data storage system;
wherein a master version of the location map is stored in a given data center and slave versions of the location map are stored at other data centers in the distributed data storage system; and
wherein changes to the location map are first applied to the master version, and then propagated to the slave versions.

4. The computer-implemented method of claim 1, wherein if the identified data centers include a local data center and one or more remote data centers, writing the copies of the data block to the identified data centers includes:
ensuring that a copy of the data block is committed to storage in the local data center;
ensuring that commands to write the data block to the one or more remote data centers have been committed to a local persistent message queue, so that the commands can be processed in the background by an asynchronous daemon; and
sending a response to the client indicating that the write request has been serviced.

5. The computer-implemented method of claim 1, further comprising:
receiving a read request from the client to read a data block from the distributed data storage system, wherein the read request includes a global identifier for the data block; and
in response to the read request,
using the global identifier to look up one or more data centers associated with the data block,
reading a copy of the data block from one of the identified data centers, and
returning the copy of the data block to the client.

6. The computer-implemented method of claim 5, wherein the lookup is performed in a database that maps global identifiers for blocks to associated data centers, and wherein for a given block and a given data center, the distributed storage system maintains a synched flag that indicates whether the given block has been committed at the given data center.

7. The computer-implemented method of claim 1, further comprising:
moving data blocks associated with a colocation group from a first data center to a second data center in the distributed data storage system; and
updating lookup structures in the distributed data storage system accordingly.

8. The computer-implemented method of claim 1, wherein the colocation hint is specified by the client as a parameter in the write request, and wherein the colocation hint can include one of:
a user identifier;
a namespace identifier for a namespace maintained by the distributed data storage system;
an application identifier; and
a geographic location identifier.

9. A non-transitory computer-readable storage medium storing instructions that when executed by a computer cause the computer to perform a method, the method comprising:
receiving a write request from a client to write a data block to a distributed data storage system, wherein the write request includes a colocation hint that identifies a colocation group associated with the data block, wherein the distributed data storage system situates copies of data blocks associated with the colocation group in the same data centers when possible; and
in response to the write request,
using the colocation hint to identify one or more data centers associated with the colocation group, and
writing copies of the data block to the one or more identified data centers.

10. The non-transitory computer-readable storage medium of claim 9, wherein using the colocation hint to identify the one or more data centers comprises:
performing a lookup using the colocation hint in a location map that associates colocation groups with data centers;
if the lookup successfully returns an entry, using data centers listed in the entry as the one or more identified data centers; and
if the lookup fails to return an entry, which indicates that the corresponding colocation group is not associated with any data centers,
associating the colocation group with one or more data centers, and
updating the location map accordingly.

11. The non-transitory computer-readable storage medium of claim 10,
wherein the location map is replicated across all data centers in the distributed data storage system;
wherein a master version of the location map is stored in a given data center and slave versions of the location map are stored at other data centers in the distributed data storage system; and
wherein changes to the location map are first applied to the master version, and then propagated to the slave versions.

12. The non-transitory computer-readable storage medium of claim 9, wherein if the identified data centers include a local data center and one or more remote data centers, writing the copies of the data block to the identified data centers includes:
  ensuring that a copy of the data block is committed to storage in the local data center;
  ensuring that commands to write the data block to the one or more remote data centers have been committed to a local persistent message queue, so that the commands can be processed in the background by an asynchronous daemon; and
  sending a response to the client indicating that the write request has been serviced.

13. The non-transitory computer-readable storage medium of claim 9, further comprising:
  receiving a read request from the client to read a data block from the distributed data storage system, wherein the read request includes a global identifier for the data block; and
  in response to the read request,
    using the global identifier to look up one or more data centers associated with the data block,
    reading a copy of the data block from one of the identified data centers, and
    returning the copy of the data block to the client.

14. The non-transitory computer-readable storage medium of claim 13, wherein the lookup is performed in a database that maps global identifiers for blocks to associated data centers, and wherein for a given block and a given data center, the distributed storage system maintains a synched flag that indicates whether the given block has been committed at the given data center.

15. The non-transitory computer-readable storage medium of claim 9, further comprising:
  moving data blocks associated with a colocation group from a first data center to a second data center in the distributed data storage system; and
  updating lookup structures in the distributed data storage system accordingly.

16. A distributed data storage system, comprising:
  one or more data centers;
  wherein during a write operation, the distributed data storage system is configured to,
    receive a write request from a client to write a data block to the distributed data storage system, wherein the write request includes a colocation hint that identifies a colocation group associated with the data block, wherein the distributed data storage system situates copies of data blocks associated with the colocation group in the same data centers when possible; and
    in response to the write request,
      use the colocation hint to identify one or more data centers associated with the colocation group, and
      write copies of the data block to the one or more identified data centers.

17. The distributed data storage system of claim 16, wherein while using the colocation hint to identify the one or more data centers, the distributed storage system is configured to:
  perform a lookup using the colocation hint in a location map that associates colocation groups with data centers;
  if the lookup successfully returns an entry, use data centers listed in the entry as the one or more identified data centers; and
  if the lookup fails to return an entry, which indicates that the corresponding colocation group is not associated with any data centers,
    associate the colocation group with one or more data centers, and
    update the location map accordingly.

18. The distributed data storage system of claim 17,
  wherein the location map is replicated across all data centers in the distributed data storage system;
  wherein a master version of the location map is stored in a given data center and slave versions of the location map are stored at other data centers in the distributed data storage system; and
  wherein changes to the location map are first applied to the master version, and then propagated to the slave versions.

19. The distributed data storage system of claim 17, wherein if the identified data centers include a local data center and one or more remote data centers, while writing the copies of the data block to the identified data centers, the distributed storage system is configured to:
  ensure that a copy of the data block is committed to storage in the local data center;
  ensure that commands to write the data block to the one or more remote data centers have been committed to a local persistent message queue, so that the commands can be processed in the background by an asynchronous daemon; and
  send a response to the client indicating that the write request has been serviced.

20. The distributed data storage system of claim 17, wherein the distributed storage system is further configured to:
  receive a read request from the client to read a data block from the distributed data storage system, wherein the read request includes a global identifier for the data block; and
  in response to the read request,
    use the global identifier to look up one or more data centers associated with the data block,
    read a copy of the data block from one of the identified data centers, and
    return the copy of the data block to the client.

21. The distributed data storage system of claim 20, wherein the lookup is performed in a database that maps global identifiers for blocks to associated data centers, and wherein for a given block and a given data center, the distributed storage system maintains a synched flag that indicates whether the given block has been committed at the given data center.

22. The distributed data storage system of claim 17, wherein the distributed storage system is further configured to:
  move data blocks associated with a colocation group from a first data center to a second data center in the distributed data storage system; and
  update lookup structures in the distributed data storage system accordingly.

* * * * *